(12) United States Patent
Tai et al.

(10) Patent No.: US 8,509,960 B2
(45) Date of Patent: Aug. 13, 2013

(54) PROVIDING COOLING TO A COMPUTER SYSTEM VIA A PEDESTAL HAVING A COOLING FAN

(75) Inventors: Mun Hoong Tai, Singapore (SG); Chee Kit John Chan, Singapore (SG); Rex Dael Navarro, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 642 days.

(21) Appl. No.: 12/533,990

(22) Filed: Jul. 31, 2009

(65) Prior Publication Data

US 2011/0026220 A1 Feb. 3, 2011

(51) Int. Cl.
*G05D 23/00* (2006.01)

(52) U.S. Cl.
USPC .......................................... 700/300

(58) Field of Classification Search
USPC .................. 700/300, 282; 165/244, 247
See application file for complete search history.

(56) References Cited

U.S. PATENT DOCUMENTS

| | | | | |
|---|---|---|---|---|
| 6,318,965 B1* | 11/2001 | Nair | ................................ | 417/2 |
| 7,088,581 B2* | 8/2006 | Modica | .................... | 361/679.48 |
| 7,196,903 B2* | 3/2007 | Vuong et al. | .................. | 361/695 |
| 7,294,980 B2* | 11/2007 | Ma et al. | ......................... | 318/49 |
| 7,789,130 B2* | 9/2010 | Chen | ............................ | 165/247 |
| 2003/0236594 A1* | 12/2003 | Frankel et al. | ................ | 700/300 |
| 2009/0299544 A1* | 12/2009 | Tanada et al. | ................. | 700/300 |

* cited by examiner

*Primary Examiner* — Mohammad Ali
*Assistant Examiner* — Sivalingam Sivanesan

(57) ABSTRACT

A computer system detects that it is coupled to a pedestal having a cooling fan. The computer system signals the cooling fan of the pedestal to operate, and signals cooling fans within the computer system to operate at lower rotational speeds having lower acoustic levels.

11 Claims, 5 Drawing Sheets

PROVIDING COOLING TO A COMPUTER SYSTEM VIA A PEDESTAL HAVING A COOLING FAN

BACKGROUND

In the art of computing, computer systems are often designed to be mounted in computer racks. A "rack unit" is a unit of measure that defines vertical distance within the rack, with a single rack unit equal to 1.75 inches. Typically, a computer system designed to fit in a rack will be slightly less tall than a multiple of a rack unit. For example, a 1 U computer system is approximately 1.65 inches tall, a 2 U computer system is approximately 3.4 inches tall, and so on. Typical dimensions of a 2 U computer system designed for a 19 inch rack are 26.5 inches deep, 19 inches wide, and 3.4 inches high.

While such computer systems are often installed in racks in computer data centers, some customers desire to operate these computer systems in office environments. Various pedestal kits are known in the art that allow 2 U computer systems to be supported in a vertical orientation. Accordingly, a typical 2 U computer system oriented in a vertical direction is 26.5 inches deep, 3.4 inches wide, and 19 inches high, thereby allowing the computer system to be positioned in a convenient location, such as alongside a desk. However, other problems remain when deploying in an office environment a computer system designed for a rack.

BRIEF DESCRIPTION OF THE DRAWINGS

The Figures depict embodiments, implementations, and configurations of the invention, and not the invention itself.

DETAILED DESCRIPTION

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

Embodiments of the present invention relate to a pedestal that includes a cooling fan that is larger and quieter than cooling fans deployed within a computer system designed to be coupled with the pedestal. By coupling a computer system to a pedestal in accordance with embodiments of the present invention, the cooling fan of the pedestal can provide significant assistance in creating airflow through the computer system, thereby allowing fans within the computer system to operate at lower acoustic levels. Accordingly, the overall acoustic level of the computer system coupled to the pedestal in accordance with embodiments of the present invention is lower than the acoustic level of the computer system operating independently. Therefore, embodiments of the present invention allow computer systems designed to operate in racks, such as a 2 U computer server, to be operated in an office environment at lower acoustic levels.

Figure 1:
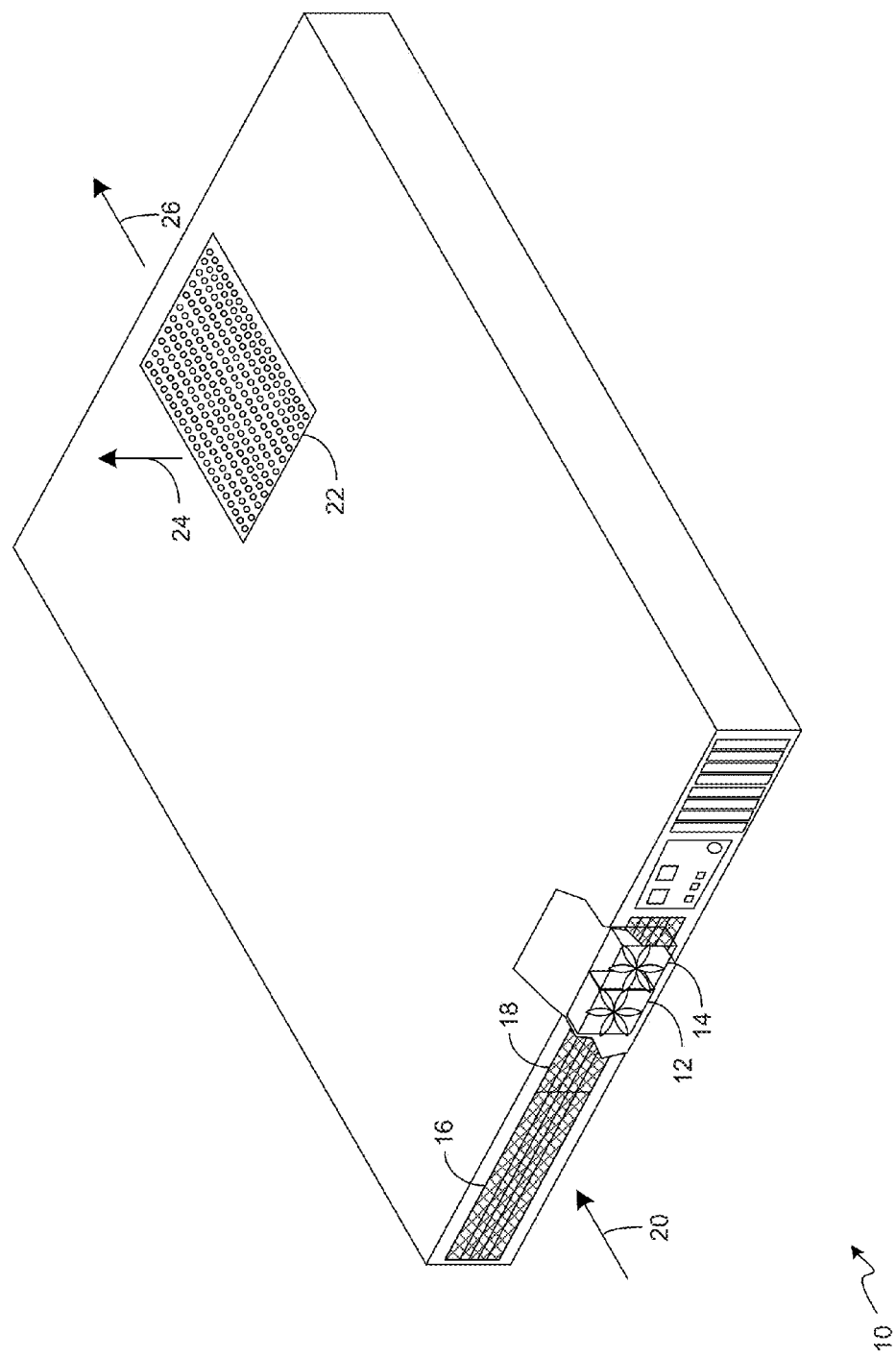
FIG. 1 shows a typical 2 U computer system designed to operate with embodiments of the present invention.

FIG. 1 shows a typical 2 U computer system 10 designed to operate with embodiments of the present invention. Computer system 10 includes a plurality of cooling fans, such as computer fans 12 and 14 shown in the cutaway portion of the front of computer system 10. Additional fans in computer system 10 are not shown in FIG. 1. It is common for 2 U computer systems, such as computer system 10, to have 6-12 cooling fans.

The cooling fans draw air into computer system 10 through vents 16 and 18 in the direction shown by arrow 20. As air flows through computer system 10, internal components, such as CPUs, memory, disk drives, core logic, and the like, are cooled by the passing air.

Air is exhausted from computer system 10 through vent 22 in the direction shown by arrow 24, and from the rear of computer system 10 in the direction shown by arrow 26. If computer system 10 is mounted in a rack with another device immediately above computer system 10, the rear of computer system 10 is the primary cooling path.

As discussed above in the Background section, a typical height for a 2 U computer system is 3.4 inches. Because of vertical limitations within the computer system, 60 mm cooling fans are often used. A typical single 60 mm cooling fan used in a rack mounted 2 U computer system and operated at 6000 rpm will produce airflow at a rate of approximately 38 CFM, and will produce sound power levels of approximately 60 dBA.

Figure 2:
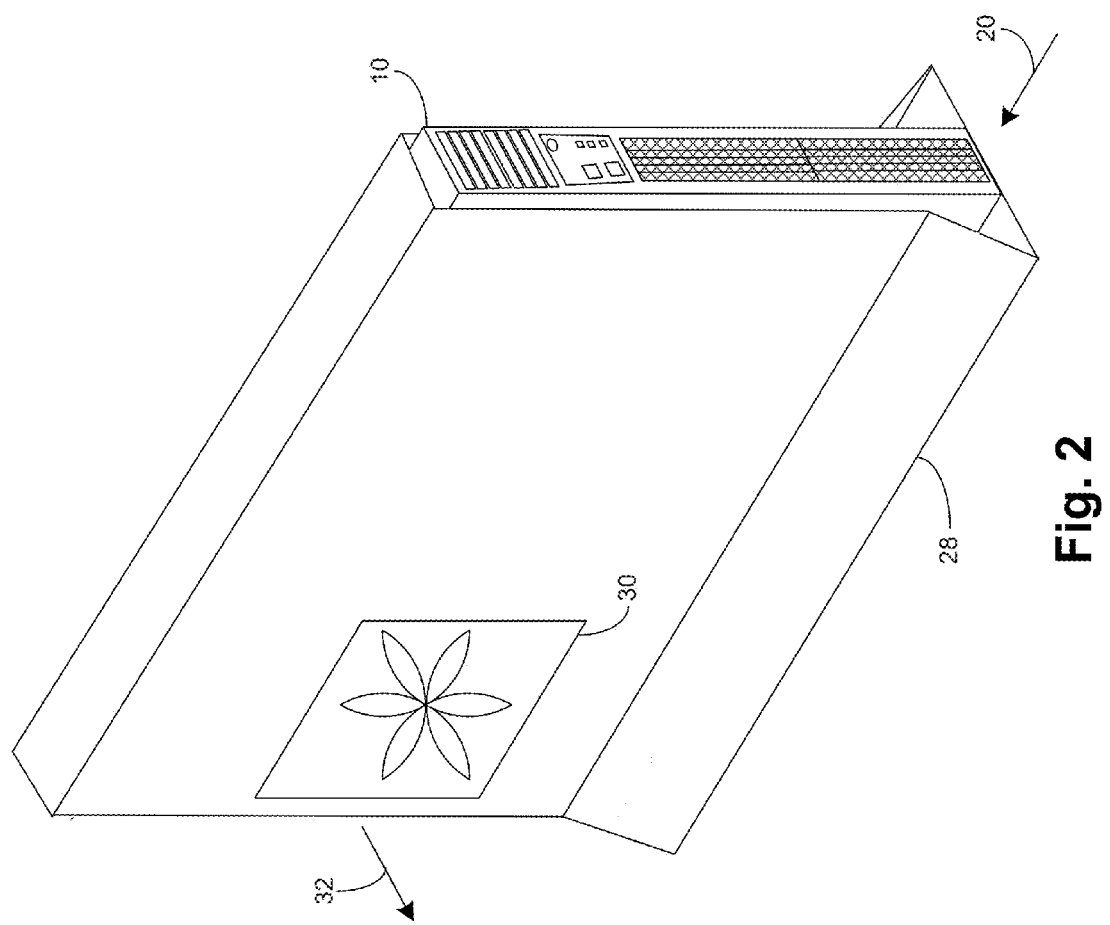
FIG. 2 shows a pedestal adapted to receive the computer system shown in FIG. 1, in accordance with embodiments of the present invention.

FIG. 2 shows a pedestal 28 adapted to receive computer system 10, in accordance with embodiments of the present invention. Pedestal 28 includes fan 30. As in FIG. 1, air enters the front of computer system 10 along the direction indicated by arrow 20. However, cooling fan 30 provides additional airflow by increasing airflow in the direction shown by arrow 32.

Since cooling fan 30 is not constrained by the dimensions of the 2 U enclosure of computer system 10, cooling fan 30 can be much larger than the 60 mm fans typically found in 2 U computer systems. For example, in one embodiment, cooling fan 30 is a 120 mm fan. A typical 120 mm can produce airflow of 40-45 CFM at 15-20 dBA, and a 120 mm fan can produce as much airflow as 88 CFM at 32 dBA.

Those skilled in the art will recognize that the size of cooling fan 30 is limited only by the vertical space available on pedestal 28. For example, computer system 10 and pedestal 28 could accommodate a 250 mm fan. Typical 250 mm fans can produce airflow of 105 CFM at 20 dBA. Those skilled in the art will also recognize that more than one cooling fan can be provided on pedestal 28. By providing a large and quiet cooling fan on pedestal 28 to contribute to the airflow through computer system 10, the internal fans of computer system 10 can be operated at lower acoustic levels, as will be described in greater detail below. Accordingly, embodiments of the present invention allow a computer system designed for use in a rack, such as a 2 U server, to be deployed in an office environment at acceptable acoustic levels.

Figure 3:
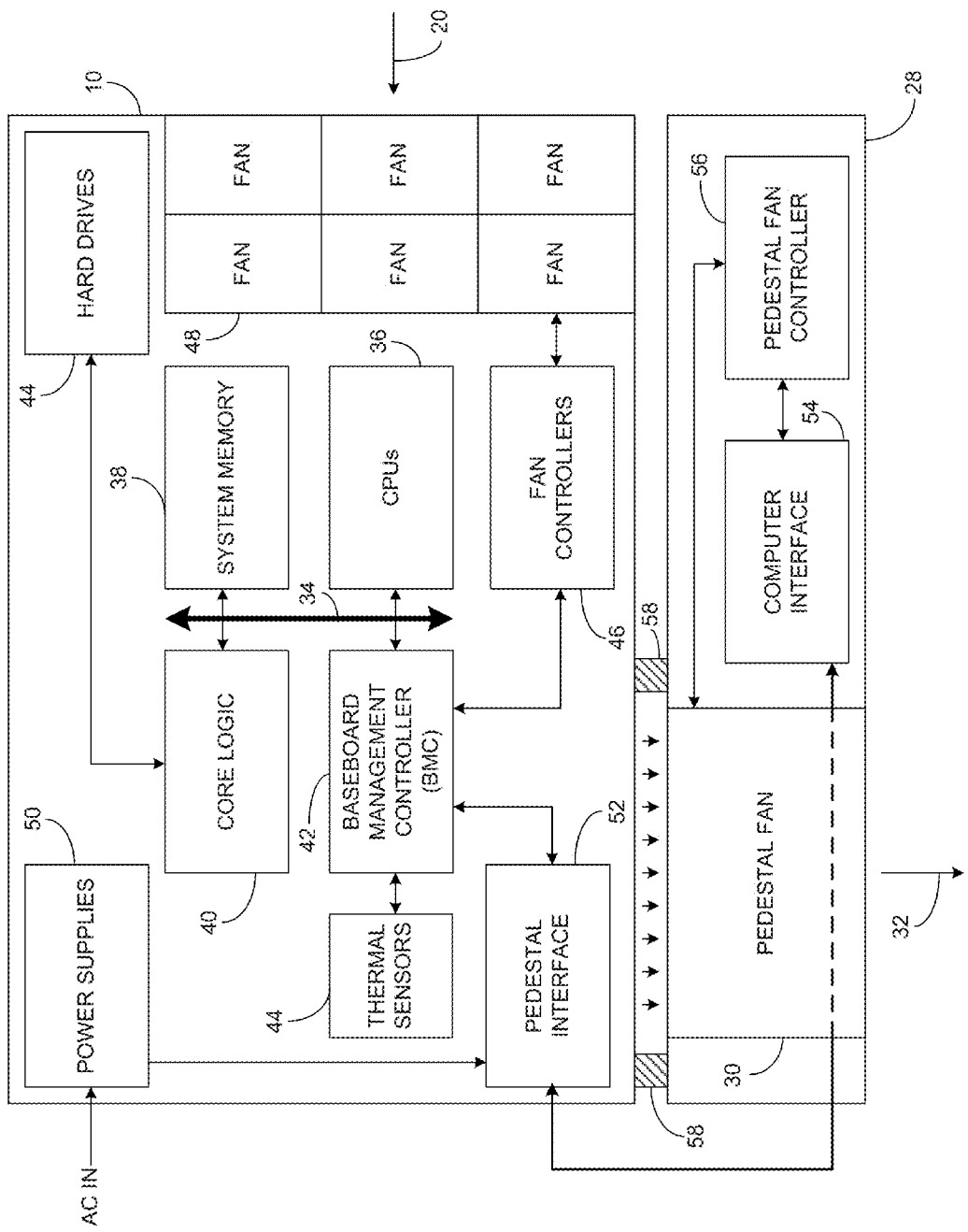
FIG. 3 shows a block diagram of the computer system shown in FIGS. 1 and 2, and the pedestal shown in FIG. 2, in accordance with embodiments of the present invention.

FIG. 3 shows a block diagram of computer system 10 and pedestal 28, in accordance with embodiments of the present invention. Although the block diagram of FIG. 3 is substantially functional, some physical features are also shown.

As shown in FIG. 3, computer system 10 includes system bus 34. Coupled to system bus 34 are CPUs 36, system memory 38, core logic 40, and baseboard memory controller (BMC) 42. Core logic 40 represents the core logic that couples CPUs 36 and system memory 38. In some architectures, core logic 40 includes a Northbridge and a Southbridge. However, other architectures are known in the art. For example, in some architectures, the memory controller is provided in the CPU. For the purposes of describing embodiments of the present invention, core logic 40 also includes other components found in a typical computer system, such as firmware and I/O components, disk controllers, USB ports, video controllers, and the like. Accordingly, core logic 40 is also coupled to hard drives 44.

BMC 42 monitors and controls several parameters, such as temperature, cooling fan availability and speeds, power modes, operating system (OS) status, and the like. Accordingly, BMC 42 is coupled to thermal sensors 44, which sense temperature at various locations within computer system 10, and fan controllers 46. Fan controllers 46 are coupled to fan array 48, which includes fans 12 and 14 shown in FIG. 1. Although fan array 48 is shown with six fans, as discussed above, more or fewer fans may be provided. The fans may be 60 mm fans, as discussed above. Airflow enters computer system 10 along the direction depicted by arrow 20.

Power supplies 50 are coupled to AC power, and represent one or more power supplies. For simplicity, the power connections to other components in computer system 10 are not shown, with the exception of a power connection to pedestal interface 52.

Pedestal interface 52 is an interface that couples computer system 10 to pedestal 28. In the configuration shown in FIG. 3, pedestal interface 52 also supplies power to pedestal 28. Pedestal interface 52 may use any appropriate interface known in the art, such as an I²C interface, a USB interface, an IEEE 1394 (FireWire) interface, a 1-Wire interface, and the like. Those skilled in the art will recognize that some interface technologies may include sufficient power to operate the components and fan within pedestal 28, while in some configurations, separate power connections may need to be provided between computer system 10 and pedestal 28.

Pedestal 28 includes pedestal fan 30, as shown in FIG. 2. Pedestal fan 30 produces airflow in the direction depicted by arrow 32. Pedestal 28 also includes a computer interface 54 and a pedestal fan controller 56. Gasket 58 is positioned between computer system 10 and pedestal 28 to seal the gap between computer system 10 and pedestal 28 and prevent air leakage around the interface.

Computer interface 54 uses the same interface technology as pedestal interface 52 discussed above, and receives power from computer system 10. Computer interface 54 is coupled to pedestal fan controller 56, which in turn controls and operates pedestal fan 30. Accordingly, BMC 42 of computer system 10 is able to control pedestal fan 30 of pedestal 28.

Figure 4:
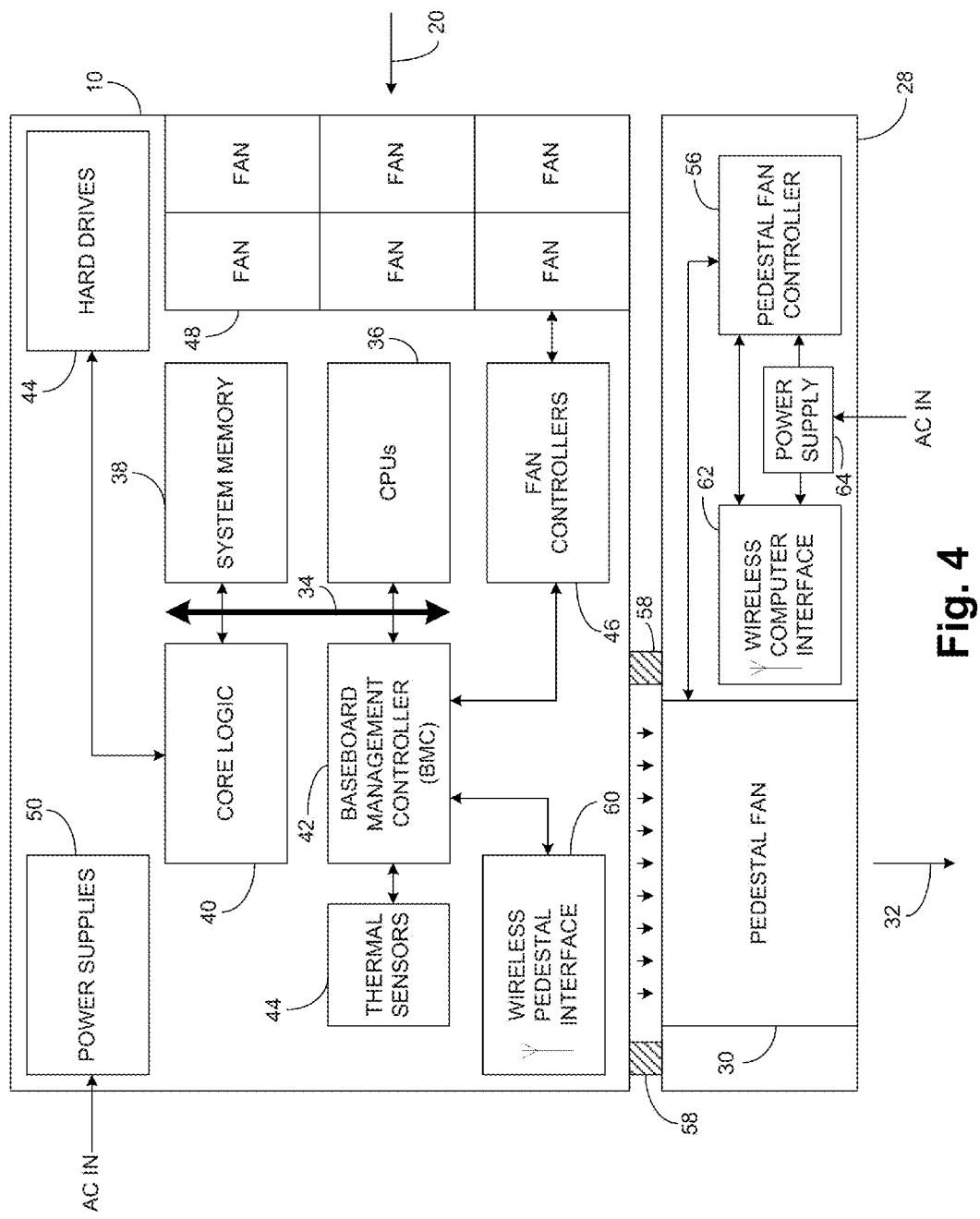
FIG. 4 shows a block diagram of another embodiment of the computer system shown in FIGS. 1 and 2, and the pedestal shown in FIG. 2, in accordance with embodiments of the present invention.

FIG. 4 shows another embodiment of computer system 10 and pedestal 28, in accordance with embodiments of the present invention. In FIG. 4, components having the same references numerals as the reference numerals shown in FIG. 3 provide similar functionality, and will not be discussed again. However, in FIG. 4, a wireless interface is provided between computer system 10 and pedestal 28, and pedestal 28 has its own power supply.

Accordingly, computer system 10 includes wireless pedestal interface 60 coupled to BMC 42. Wireless pedestal interface 60 can use any suitable wireless technology, such as a wireless ZigBee interface based on the IEEE 802.15.4-2003 standard, a Bluetooth interface, an 802.11a, 802.11b, 802.11g, or 802.11n interface, a wireless USB interface, and the like.

In pedestal 28, wireless computer interface 62 uses the same wireless technology as wireless pedestal interface 60 of computer system 10. Wireless computer interface 62 is coupled to pedestal fan controller 56, which controls pedestal fan 30.

Pedestal 28 also includes power supply 64, which receives AC power and is coupled to wireless computer interface 62 and pedestal fan controller 56. Pedestal fan 30 receives power from power supply 64 via pedestal fan controller 56.

Note that the method by which power is supplied to pedestal 28 can be configured independently from the communication method. Accordingly, the embodiment of pedestal 28 shown in FIG. 3 may be provided with a separate power supply, as shown in FIG. 4, and the embodiment of pedestal 28 shown in FIG. 4 may be provided power via a power connection to computer system 10, as shown in FIG. 3.

Figure 5:
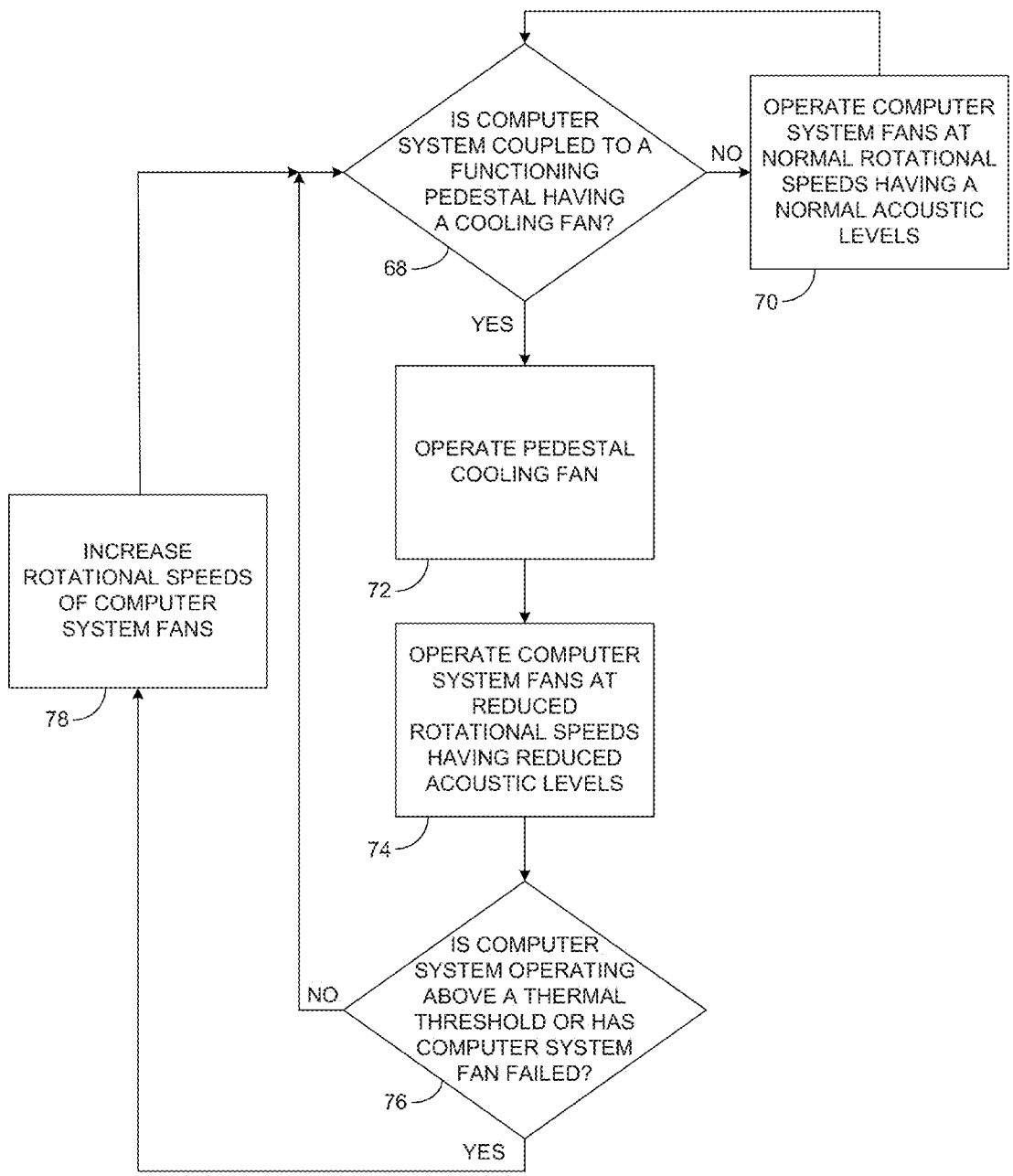
FIG. 5 shows a flow chart that describes a control method executed by a baseboard memory controller of the computer systems shown in FIGS. 3 and 4.

FIG. 5 shows a flow chart 66 that describes a control method executed by BMC 42 of FIGS. 3 and 4, in accordance with embodiments of the present invention. Discussion of the method begins at decision block 68, which determines whether the computer system is coupled to a functioning pedestal having a cooling fan. If the computer system is not connected to a functioning pedestal having a cooling fan, the NO branch is taken to block 70.

At block 70, BMC 42 signals fan controllers 46 to operate the fans of fan array 48 at normal rotational speeds having normal acoustic levels. As mentioned above, a typical normal rotational speed for such a fan is 6000 rpm, and a typical acoustic level is 60 dBA. Control then passes back to decision block 68. Note that this loop, along with the loop discussed below with reference to decision block 76, provide a "hot plug" capability that continually tests for the presence of a functioning pedestal having a cooling fan and controls the computer system fans accordingly.

At decision block 68, if the computer system is connected to a functioning pedestal having a cooling fan, the YES branch is taken to block 72. At block 72, BMC 42 signals pedestal fan 30 of pedestal 28, using the communication methods discussed above, to operate. Control then passes to block 74.

At block 74, BMC 42 signals fan controllers 46 to operate the fans of fan array 48 of computer system 10 at reduced rotational speeds having reduced acoustic levels. At this point, a computer system 10 operating with a pedestal 28 in accordance with embodiments of the present invention is generating a lower acoustic level than the acoustic level generated by computer system 10 operating independently. Typically, a reduced rotational speed will be 3500 rpm or less, and produce a reduced acoustic level of 47 dBA or less. Control then passes to decision block 76.

Decision block 76 and block 78 describe an additional advantage provided by embodiments of the present invention. In the discussion above, the cooling fan in the pedestal unit is provided to allow the cooling fans of the computer system to operate at lower acoustic levels, thereby making computer system 10 more suitable for an office environment. However, the cooling fan of pedestal 28 can also be used to provide additional cooling capacity and redundancy. For example, office air conditioning may fail, and the temperature in the office may increase. Furthermore, one or more of the cooling fans of computer system 10 may fail.

At decision block 76, BMC 42 determines, via thermal sensors 44 and fan controllers 46, whether the computer system is operating above a thermal threshold, or whether one of the fans of computer system 10 has failed. A typical thermal threshold is 35° C., but those skilled in the art will recognize that higher or lower thresholds may be used. If the answer is no, the NO branch is taken back to decision block 68, and the method executes again. However, if the answer is yes, the YES branch is taken to block 78.

At block 78, BMC 42 signals fan controllers 46 to increase the rotational speeds of the fans of fan array 48. While doing so will increase acoustic levels, computer system 10 can continue to operate. Once the high thermal event has ended, or the failed computer system fan has been replaced, acoustic levels may once again be decreased, as described above. Control then passes back to decision block 68, and the method repeats.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   a pedestal comprising:
      a pedestal fan;
      a computer interface;
      a pedestal fan controller coupled to the computer interface and the pedestal fan; and
   a computer system comprising:
      an array of computer system fans;
      computer system fan controllers coupled to the array of computer system fans;
      a vent aligned with the pedestal fan to allow the pedestal fan to assist in creating airflow through the computer system;
      a pedestal interface coupled to the computer interface of the pedestal;
      a management controller coupled to the computer system fan controllers and the pedestal interface, wherein the management controller lowers rotational speeds of fans of the array of computer system fans, thereby lowering acoustic levels of the fans, when the management controller initiates operation of the pedestal fan.

2. The system of claim 1 wherein the computer interface of the pedestal and the pedestal interface of the computer system are coupled by a wired connection.

3. The system of claim 1 wherein the computer interface of the pedestal and the pedestal interface of the computer system are coupled by a wireless connection.

4. The system of claim 1 wherein the management controller increases rotational speeds of the fans of the array of fans upon detecting that the computer system is operating above a thermal threshold or upon detecting that a fan of the array of fans has failed.

5. The system of claim 1 wherein the pedestal fan, the computer interface, and the pedestal fan controller to receive power from the computer system.

6. The system of claim 1 further comprising a power supply to provide power to the pedestal fan, the computer interface, and the pedestal fan controller.

7. A computer system comprising:
   an array of computer system fans;
   computer system fan controllers coupled to the array of computer system fans;
   a vent configured to be aligned with a pedestal fan of a pedestal when the computer system is operated in conjunction with the pedestal, wherein the pedestal fan assists in creating airflow through the computer system;
   a pedestal interface configured to be coupled to a computer interface of the pedestal; and
   a management controller coupled to the computer system fan controllers and the pedestal interface, wherein the management controller lowers rotational speeds of fans of the array of computer system fans, thereby lowering acoustic levels of the fans, when the computer system is operated in conjunction with the pedestal and the management controller initiates operation of the pedestal fan.

8. The computer system of claim 7 wherein the pedestal interface is configured to communicate with the computer interface of the pedestal via a wired connection.

9. The computer system of claim 7 wherein the pedestal interface is configured to communicate with the computer interface of the pedestal via a wireless connection.

10. The computer system of claim 7 wherein the pedestal fan to receive power from the computer system.

11. The computer system of claim 7 further comprising a power supply to provide power to the pedestal fan.

\* \* \* \* \*